United States Patent [19]

Edmisten

[11] Patent Number: 5,205,382
[45] Date of Patent: Apr. 27, 1993

[54] AIRCRAFT BRAKE

[75] Inventor: Frank D. Edmisten, Troy, Ohio

[73] Assignee: The B F Goodrich Company, Akron, Ohio

[21] Appl. No.: 846,318

[22] Filed: Mar. 5, 1992

Related U.S. Application Data

[63] Continuation of Ser. No. 594,471, Oct. 9, 1990, abandoned.

[51] Int. Cl.$^5$ .............................................. F16D 55/36
[52] U.S. Cl. ............................ 188/71.5; 92/129;
188/71.8; 188/72.4; 188/196 R; 188/217;
188/264 G; 188/369; 403/74
[58] Field of Search .............. 188/264 G, 217, 196 R,
188/196 P, 71.8, 71.5, 72.4, 369, 370; 192/70.2,
70.25; 92/129; 403/74, 76, 114, 115, 122

[56] References Cited

U.S. PATENT DOCUMENTS

| 3,172,340 | 3/1965 | Blenkle | 403/122 X |
| 3,498,418 | 3/1970 | Dewar | 188/71.5 |
| 3,592,303 | 7/1971 | Tincher | 188/264 G |
| 3,890,884 | 6/1973 | Silberschlag | 188/217 X |
| 4,180,147 | 12/1979 | Tiarksen et al. | 188/71.8 |

FOREIGN PATENT DOCUMENTS

| 1251102 | 9/1967 | Fed. Rep. of Germany | 188/72.4 |
| 1156536 | 10/1958 | France | 188/71.5 |
| 266328 | 10/1989 | Japan | 188/72.4 |
| 26330 | 1/1990 | Japan | 188/72.4 |
| 2021219 | 11/1979 | United Kingdom | 188/72.4 |

*Primary Examiner*—George E. A. Halvosa
*Attorney, Agent, or Firm*—Joseph Januszkiewicz

[57] ABSTRACT

An aircraft multiple disc and brake assembly having an axle with a cylindrical wheel member journaled thereon. The inner peripheral portion of the wheel member has a plurality of circumferentially spaced splines to support axially spaced rotor discs which are interleaved with stator discs which are splined to axially extending ribs mounted on a torque tube which in turn is connected to the axle. A piston support member is secured to the axle via a hub member and has a plurality of circumferentially spaced cylinders with a piston slidably mounted therein. One end of each piston cooperates with the receiving cylinder to define a piston chamber that permits pressurization to actuate the braking action. The other end of the piston has a pair of discs with mating spherical contoured surfaces to permit a tilting therebetween to eliminate side loading and provide even wear.

7 Claims, 6 Drawing Sheets

AIRCRAFT BRAKE

This case is a continuation of U.S. application Ser. No. 07/594,471 filed on Oct. 9, 1990, now abandoned.

BACKGROUND OF THE INVENTION

This invention relates to a friction aircraft braking system and more particularly to a new and improved multiple actuator for an aircraft wheel and brake assembly.

During the braking of an aircraft, a plurality of alternately splined stator and rotor discs are brought into sliding frictional engagement with each other generating considerable heat within the braking elements and the supporting structure. The stator and rotor discs, which can be made of metal or carbon, can withstand the high heat build-up in such brakes, with heat shields provided for the adjacent structures to limit heat absorption. For the immediate adjacent structures such as the multiple actuating mechanisms of the plural pistons and their cylinders insulators are used to limit the heat absorption. The supporting structure for the brake actuating pistons and cylinders must be designed to be lightweight as other component parts to enhance the overall need to keep the weight manageable and fuel efficient.

The present invention recognizes that the interfacing between the pressure plate and the forwardly disposed faces of the pistons that are circumferentially spaced around the piston housing are parallel surfaces and that under severe braking forces, they encounter tremendous stress forces that tend to deflect the outer radial portions of the piston housing to cock their corresponding pistons in their respective housings. This action causes side loading and uneven wear of the piston and its supporting structure including the pressure plate. Bending action increases as the brake discs wear and the piston elements must extend axially outward a greater distance for full brake application. The bending action and resultant side loading is especially harmful to assemblies that have automatic adjusters built into the pistons, due to excessive wear on close clearance adjuster components, and increased difficulty in maintaining an effective seal of hydraulic fluid. It is an objective of the present invention to provide means for maintaining the alignment of the forwardly disposed portions of the piston or piston heads with the pressure plate regardless of the piston housing deflection, thereby reducing the effects of side loading. An additional benefit of this construction is improved distribution of actuation force into the heat sink providing more even wear and reduced temperature differential across heat sink wear surfaces. This will improve disk utilization resulting in longer use between overhauls and improved performance for high-energy stops.

SUMMARY OF THE INVENTION

The present invention is directed to an aircraft multiple disc brake assembly having a wheel member with axial splines engaging rotor discs which are interleaved with stator discs that are splined to a torque tube. The torque tube is secured to a hub and piston housing which in turn supports piston means including a plurality of circumferentially spaced pistons whose head has an inner cap and an outer cap with mating portions of spherical configuration to allow relative pivoting action between the caps to maintain parallel faces of the outer cap with the adjacent face of a stator disc.

DETAILED DESCRIPTION

Figure 1:
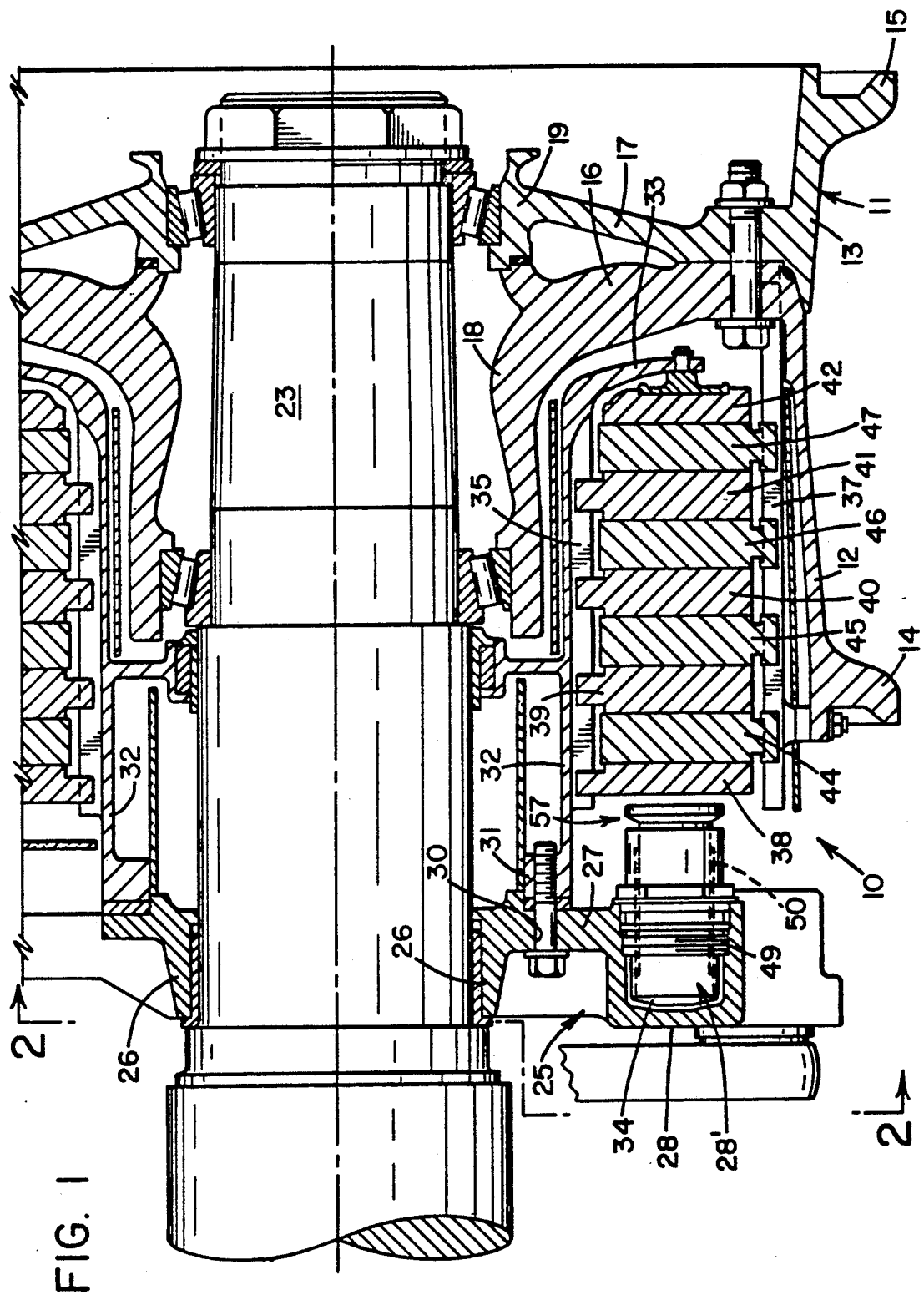
FIG. 1 is a fragmentary cross-sectional view of an aircraft brake assembly showing a piston housing and piston assembly as mounted on an aircraft installation.

Referring to the drawings, wherein like reference numerals designate like or corresponding parts throughout the several views, there is shown in FIG. 1 a friction brake mechanism 10 for use with a cylindrical wheel 11 having matching wheel sections 12 and 13. Each of the wheel sections 12 and 13 has a rim member 14 and 15, web member 16 and 17, and hub members 18 and 19. The wheel sections 12 and 13 are fastened together by suitable bolts disposed in aligned bores within web members 16 and 17 to form an integral unit herewith.

Figure 2:
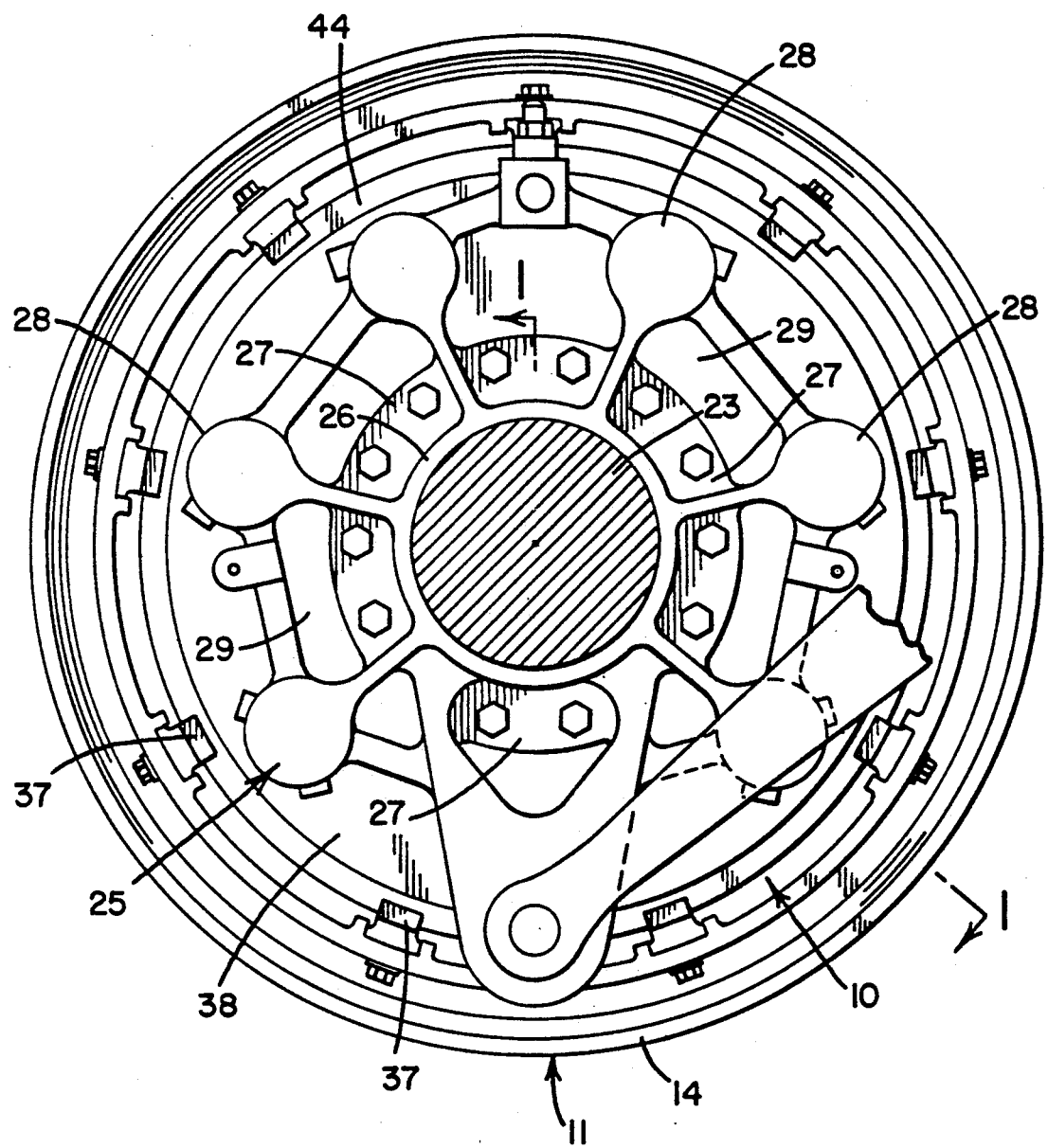
FIG. 2 is a front elevational view of the brake assembly taken on line 2—2 of FIG. 1 showing the piston housing.

The hub members 18 and 19 are supported for rotation on suitable bearings, which are mounted on a nonrotatable axle member or axle means 23 having a central axis. Mounted on axle member 23 is a carrier 25, which carrier 25 has an inner hub or rim portion 26, a radially extending flange portion 27 and a plurality of circumferential cylinders or cylinder housings 28. Such carrier 25 is often referred to as a piston housing or a piston support member. The carrier or piston housing 25 has a plurality of spaced apart openings 29 as shown in FIG. 2 to reduce overall weight. Flange 27 of the piston housing has a plurality of circumferentially spaced bores 30 for securing such flange to an annular hub 31 of a cylindrical torque tube member or torque tube 32, which torque tube member 32 has an annular and radially outwardly extending reaction plate or reaction member 33. The reaction plate 33 may be made integral with the torque tube member 32 or may be made as a separate annular piece and suitably connected to the torque tube or torque tube member 32.

Torque tube 32 has a plurality of circumferentially spaced splines or spline members 35 which are axially extending. Wheel section 12 has a plurality of circumferentially spaced ribs or splines 37 on its inner peripheral surface, which may be cast therein or may be machined to provide an integral type rib or spline for the brake assembly.

Spline members or ribs 35 support an axially nonrotatable pressure plate or end disc 38 and inner nonrotatable discs 39, 40, and 41. All of such (stator discs) nonrotatable discs 38, 39, 40 and 41 have slotted openings at circumferentially spaced locations on the inner periphery for captive engagement by the spline members 35 as is old and well known in the art. Such discs 38, 39, 40, and 41 constitute the stators for friction brake 10. An annular disc or annular braking element 42 is suitably connected to the reaction plate 33 and acts in concert with the stator discs 38, 39, 40 and 41.

A plurality of axially spaced discs 44, 45, 46 and 47 interspaced or interleaved between the stator discs 38 through 42, have a plurality of circumferentially spaced openings along their outer periphery for engagement by the corresponding ribs 37 as is old and well known in the art thereby forming the rotor discs for the friction brake 10. All of the nonrotatable discs 38 through 42 and rotatable discs (44 through 47) may be made from a suitable brake material such as metal, steel or other wear-resistant material for withstanding high temperatures and providing a heat sink. The number of discs may be varied as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots. Such reinforcing inserts are also referred to as drive clips.

Figure 3:
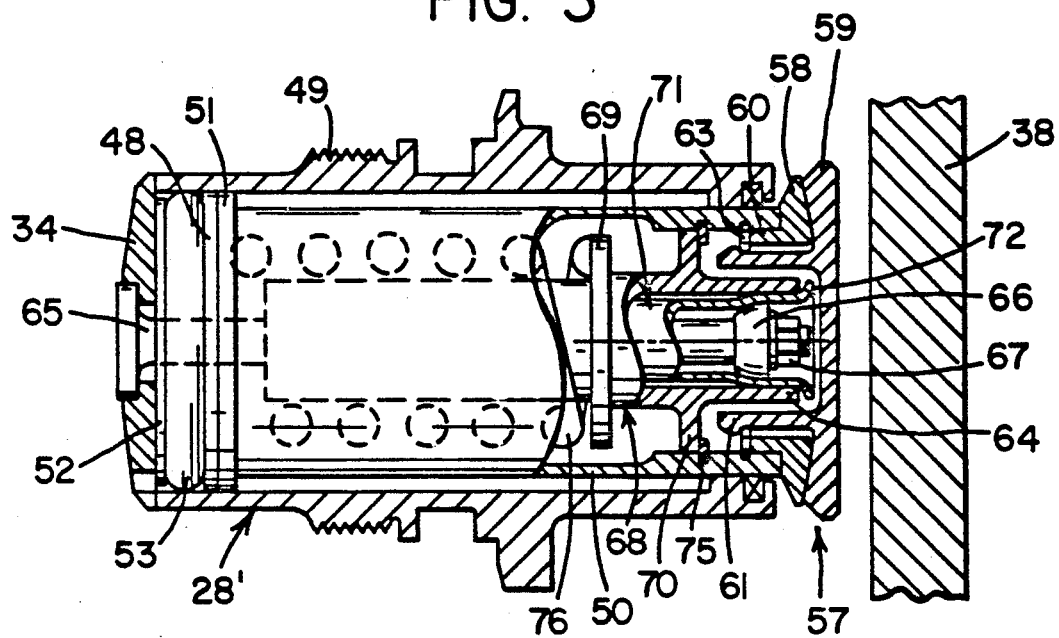
FIG. 3 is an enlarged cross-sectional view of a piston and cylinder assembly.
Figure 4:
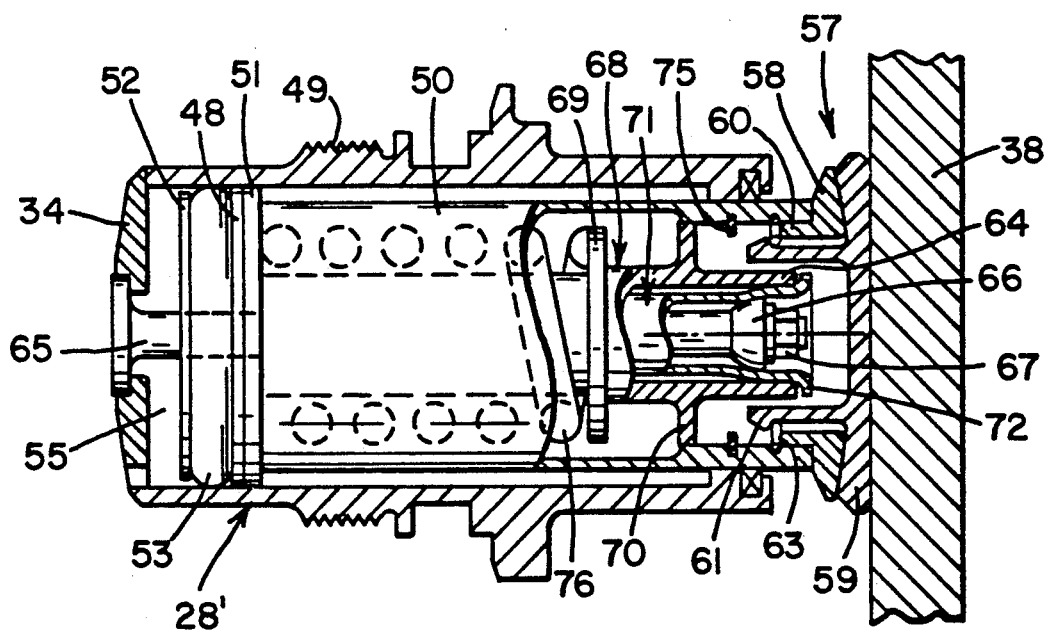
FIG. 4 is a cross-sectional view of a piston and cylinder assembly having the piston head engaging the adjacent stator disc or pressure plate.
Figure 5:
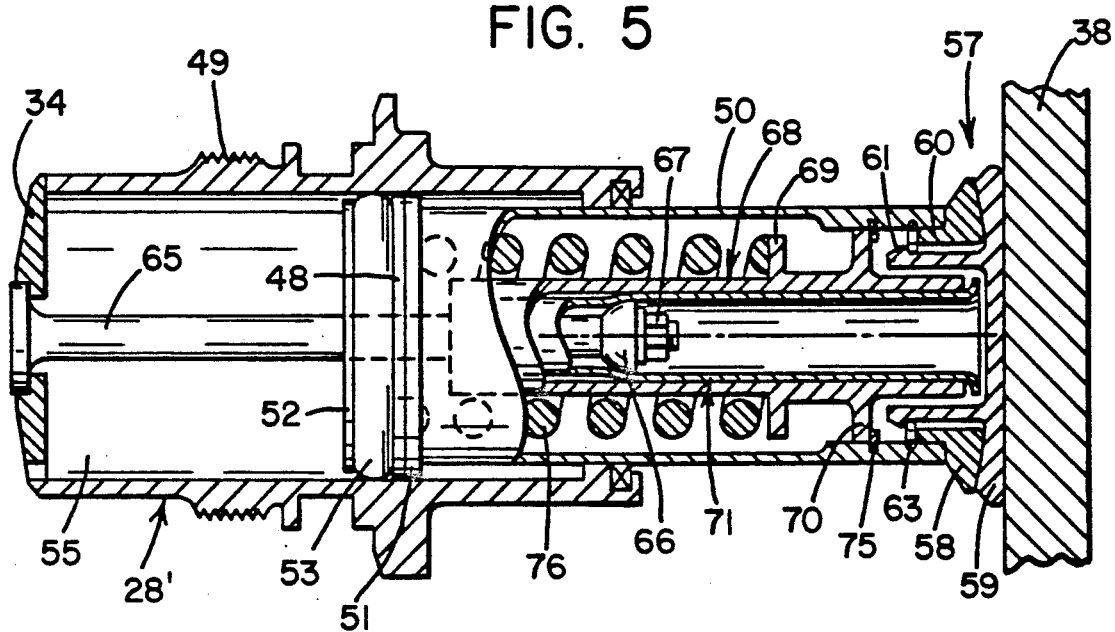
FIG. 5 is a cross-sectional view of a piston and cylinder assembly similar to that shown in FIG. 4 but with piston head extended axially outwardly a greater distance to illustrate wear and take up due to brake disc wear.
Figure 6:
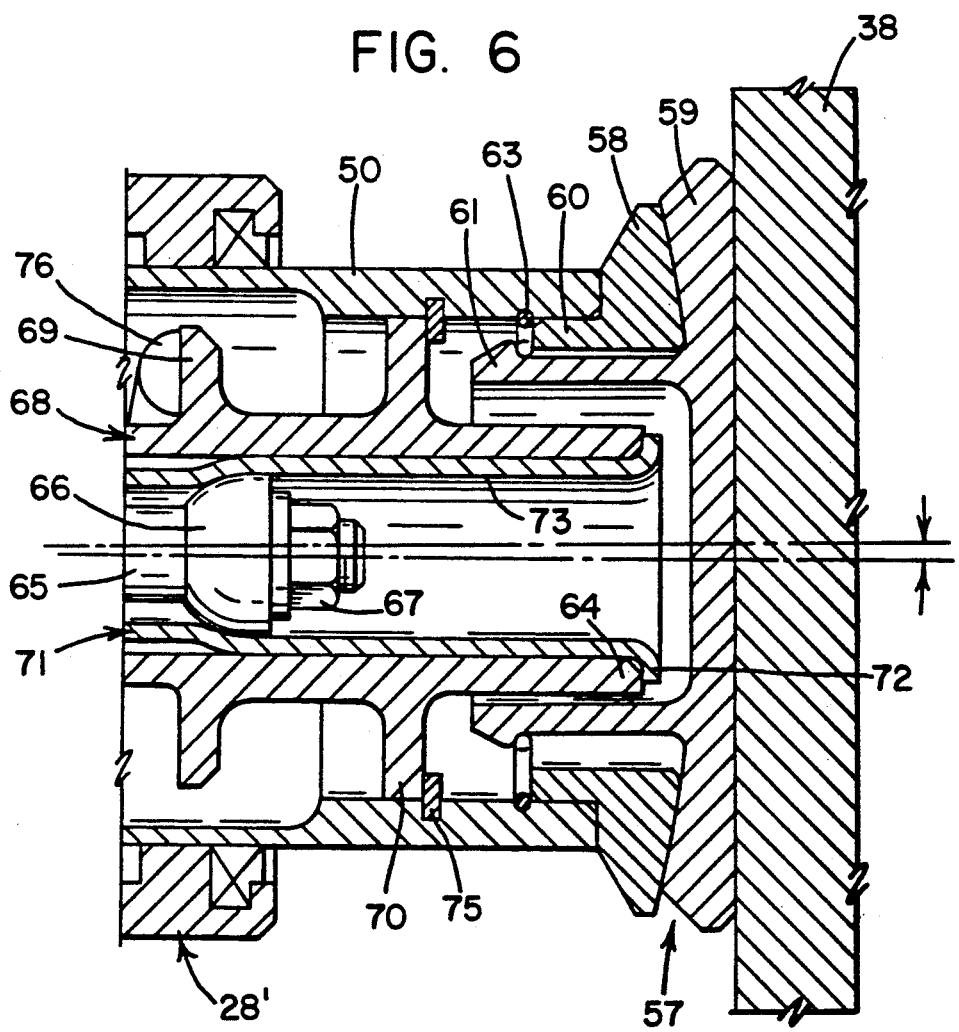
FIG. 6 is an enlarged cross-sectional view of the forwardly disposed portion of the piston and cylinder assembly engaging the pressure plate.

The actuating mechanism for the brake includes the piston housing 25 which contains the circumferentially spaced cylinder housings 28, which as shown in FIG. 1 is integral with the flange 27 and rim portion or hub 26. The cylinder housings 28 receive a piston cylinder 28' which as shown in FIG. 3 is threaded on its outer surface as at 49 for convenience of assembling into the cylindrical housing 28. Only one piston cylinder 28' will be described. The cylinder 28' has an end wall 34 with a sleeve 50 slidably mounted therein. One end of sleeve 50 has a pair of spaced flanges 51 and 52 to receive therebetween a packing 53 which slidingly engages the interior wall of the piston cylinder to define a piston chamber 55 between the end wall 34 of such cylinder 28' and the end of the sleeve 50 containing flange 52 as shown in FIGS. 4 and 5. Such flanges 51 and 52 along with the sleeve 50 defines a portion of the piston. As shown in FIGS. 3 and 4, a packing back-up ring 48 is mounted between flange 51 and the packing ring 53. The one flange 52 is an end flange or end plate member.

The other end of sleeve 50 has a piston head 57 with a rearwardly disposed or inner cap 58 and a forwardly disposed or outer cap 59. Cap 58 has a reduced annular portion 60 that is received by the sleeve 50. Cap 59 has a reduced annular portion 61 that is received within annular portion 60. The respective mating surfaces of the cap 58 and 59 are spherical in contour or shape to permit a movement of the outer cap 59 relative to the inner cap 58 as to be described. The mating surface of the outer disc 59 has a dry film lubricant thereon to facilitate relative movement between the inner cap 58 and the outer cap 59. The annular portion 61 of cap 59 is retained relative to the annular portion 60 of cap 58 by a retaining ring 63 to facilitate the displacement of the outer cap 59 relative to inner cap 58. The sleeve 50 along with end plate member 51 and piston head 57 (caps 58, 59) define a piston means which is slidably positioned within the piston cylinder 28'. The chamber 55 is suitably connected to an inlet port and an outlet port controlled by valve means in a manner old and well known in the art, whereby pressurization of chamber 55 controls the movement of the piston or piston means. Suitably secured to the end wall 34 of cylinder or piston cylinder 28' is one end of a longitudinally extending rod 65, which rod 65 extends into the interior of the sleeve 50 through a bore in the end flange or plate member 51. The other end of rod 65 has a hardened ball 66 secured thereto as by a nut 67. A tubular member 68 with coaxially spaced flanges 69 and 70 is concentrically mounted within sleeve 50 and has its one end 64 located within the reduced annular portion 61 of outer cap 59. A deformable tube 71 has its one end 72 suitably connected as by swaging to the one end 64 of tubular member 68 as clearly shown in FIGS. 3, 4 and 5. The ball 66 is closely received by the interior bore 73 of the deformable tube 71.

The one flange 70 of tubular member 68 abuttingly engages an annular ring or stop ring 75 that is mounted within the bore of piston cylinder 28'. Such stop ring 75 limits the extreme outward movement of the tubular member 68 relative to the piston. A spring 76 encircles tubular member 68, having one end abutting flange 69 while the other end abutting the annular flange 51 on the piston to thereby act as a means for maintaining the piston's outer disc 59 in the retracted position relative to the cylinder 28' upon exhausting the pressurized fluids within chamber 55. The piston head 57 is movable into engagement with stator disc 38 upon pressurization of chamber 55. After repeated applications of the piston and piston head 57 on the stator disc 38 and other interleaved brake discs, the brake discs will wear and then require the piston and piston head 57 to travel further to apply the brake discs against each other and against the end stator disc 42. To compensate for this wear, the piston and piston head 57 in FIG. 4 shows the ball 66 on rod 65 as substantially adjacent to the piston head 57 while FIG. 5 shows the ball 66 as having traveled a substantial distance within deformable tube 71 which allows the piston and piston head 57 to move outwardly on rod 65 a substantial distance (which action defines the condition of substantial wear of the stator and rotor brake discs). Further wear of the brake discs would allow the piston and piston head 57 to move a little farther than that shown in FIG. 5 wherein hardened ball 66 would deform tube 71 slightly more than that shown, which action allows tubular member 68 and its accompanying deformable sleeve to move rightward as seen in FIG. 5. This action of the deformable sleeve 71 along with ball 66 within the piston is a wear adjuster means.

Figure 7:
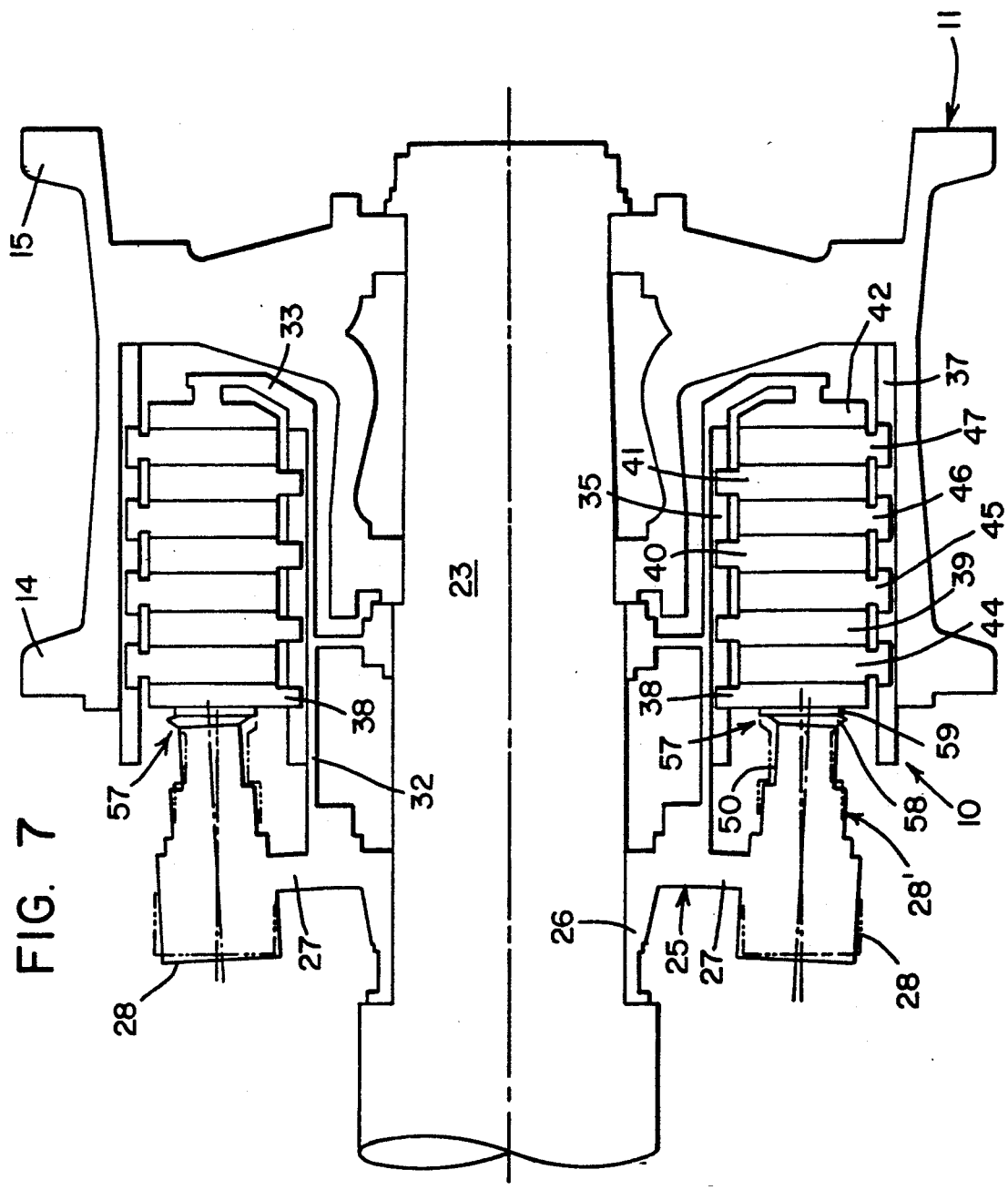
FIG. 7 is a schematic side elevational view similar to FIG. 1 illustrating the principal of the invention showing the bending of the piston housing relative to the pressure plate on full extension of the piston assembly.
Figure 8:
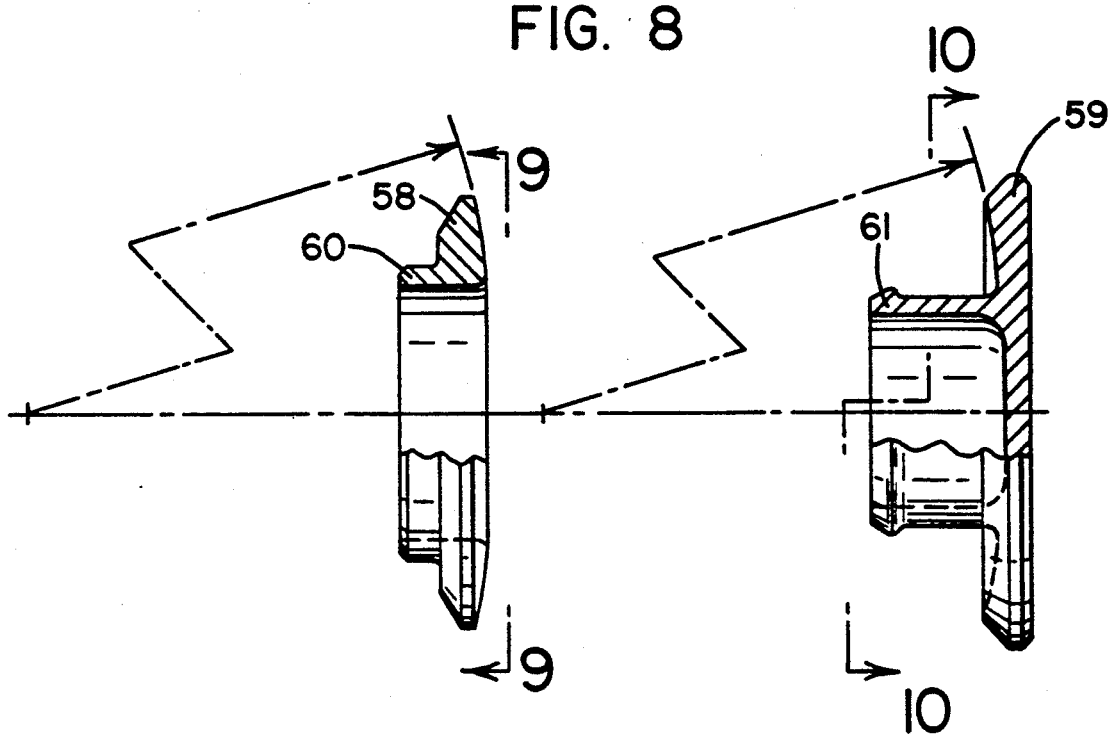
FIG. 8 is a side elevational view partly in section of the inner and outer cap of a piston head in exploded view.
Figure 9:
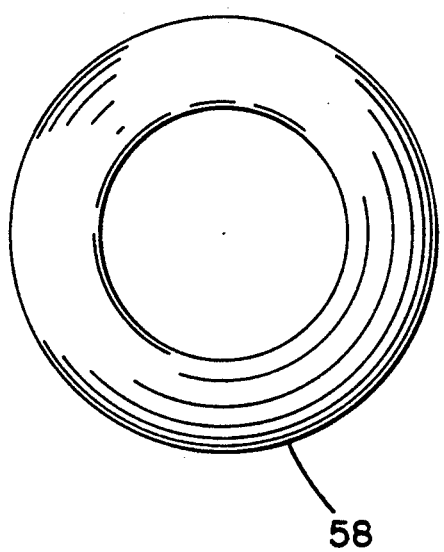
FIG. 9 is a front elevational view of the inner cap taken on line 9—9 of FIG. 8.
Figure 10:
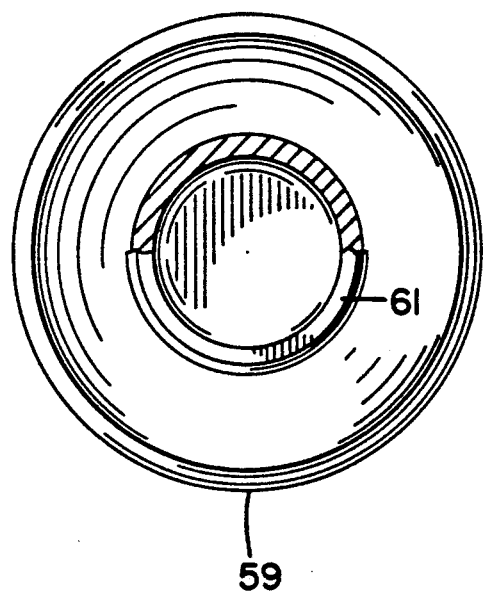
FIG. 10 is a front elevational view of the outer cap partly in cross-section taken on line 10—10 of FIG. 8.

FIG. 7 illustrates the situation where there has been a condition of substantial wear of the stator and rotor discs, causing the deformable tube 71 to be deformed by ball 66 to cause the piston head 57 (caps 58 and 59) to extend a substantial distance from the piston cylinder 28', which during a braking action will cause a deformation or bending of the piston support member or piston housing 25. In the structure of the instant invention, because of the unique spherical mating surfaces of the inner cap 58 with the convex surface of the outer cap 59, the outer cap 59 will pivot slightly on such inner cap to assure parallel alignment of the outer cap's surface with the pressure plate regardless of the piston housing's deflection to prevent the cocking of the sleeve 50 within the cylinder 28' to prevent side loading and uneven wear on these parts which otherwise would occur and would occur with a greater degree. With the structure of the described invention, the force distribution across the heat sink is improved not only from a reduction in side loading but also because the force is spread out due to the spherical surface being convex (outer disc 59) relative to the heat sink of the interleaved stator and rotor discs.

Various modifications are contemplated and may obviously be resorted to by those skilled in the art without departing from the described invention, as only a preferred embodiment thereof has been described.

I claim:

1. In an aircraft multiple disc and brake assembly having an axle means with a central axis; a cylindrical wheel member journaled on said axle means; said cylindrical wheel member having an inner peripheral circumferentially extending portion and a radially disposed rim portion for mounting on said axle means for rotation thereon; said inner peripheral portion has a plurality of circumferentially spaced splines; a plurality of axially spaced rotor discs mounted on said axle and keyed to said splines for rotation therewith; said axle means having a stationary hub means; a torque tube secured to said hub means; said torque tube having a plurality of axially extending ribs; a plurality of stator discs with circumferentially spaced slots engaging said ribs for axial movement of said stator discs; said rotor discs interleaved between said stator discs to define a brake stack; a piston support member secured to said hub, a plurality of circumferentially spaced cylinders mounted on said piston support member; each cylinder having an elongated piston sleeve slidably mounted therein; one end of said piston sleeve has an end wall that is cooperative with said cylinder to define a piston chamber which is selectively pressurized, the other end of said piston sleeve has a pair of caps integral therewith and with annular mating surfaces; one of said caps has an annular portion secured to said sleeve while the other one of said caps has a rearwardly disposed annular portion movably retained relative to said one cap, said other one of said caps has a forwardly disposed disc portion operative to engage said brake stack; and said annular mating surface of said one cap secured to said sleeve has a convex surface mating with a concave surface of said other cap to distribute forces away from the axis of said sleeve as said other cap engages said brake stack.

2. In an aircraft multiple brake disc and brake assembly as set forth in claim 1 wherein said caps are heat insulators.

3. In an aircraft multiple brake disc and brake assembly as set forth in claim 2 wherein said mating surfaces of said caps have a dry film lubricant thereon.

4. In an aircraft multiple brake disc and brake assembly as set forth in claim 1 wherein wear adjuster means are mounted in each of said piston sleeves which cooperates with said caps to define cup shaped pistons.

5. In an aircraft multiple brake disc and brake assembly as set forth in claim 4 wherein each of said wear adjuster means has a rod member extending through said end wall of said piston sleeve which is secured to said cylinder, and said wear adjuster means is operative upon pressurization of said piston chamber to extend said caps a substantial distance beyond said cylinder under substantial wear of said brake discs.

6. In an aircraft multiple brake disc assembly having an axis means with a central axis; a wheel member journaled on said axle means for rotation thereon; said wheel member having an inner peripheral portion with a plurality of circumferentially spaced splines; a plurality of axially spaced rotor brake discs mounted on said axle means and keyed to said splines for rotation with said wheel member; said axle means having a stationary hub; a torque tube secured to said hub; said torque tube having a plurality of circumferentially spaced axially extending ribs; a plurality of axially spaced stator brake discs mounted on said axle means and keyed to said ribs for axial movement thereon; said rotor discs interleaved with said stator discs; a piston housing secured to said hub; one of said stator discs being closely adjacent to said piston housing defining a pressure plate for said rotor and stator brake discs; a plurality of circumferentially spaced cylinders mounted on said piston housing; each cylinder having a bore therein with an end plate at one end thereof; a piston member slidably mounted in each of said bores and cooperative with an adjacent end plate of said cylinder to define piston chambers; each piston member having an elongated cylindrically shaped sleeve member; each sleeve member having a piston head that extends out of said bore of said cylinder; each of said piston heads having an inner cap and an outer cap integral therewith; said inner cap having an annular rearwardly disposed portion secured to said sleeve member; said outer caps being operative to frictionally engage said pressure plate; said inner cap and outer cap of each piston head having annular mating surfaces with the annular mating surface of said inner cap having a convex shape to allow pivoting movement of the outer cap relative to the inner cap upon deflection of said piston housing upon brake application to distribute forces away from the axis of said cylindrically shaped sleeve member.

7. In an aircraft multiple brake disc assembly as set forth in claim 6 wherein said outer cap has a central hub secured to said inner cap by a retaining ring to allow angular displacement of said outer cap relative to said inner cap.

* * * * *